Nov. 29, 1932.

J. U. DUFFY ET AL

BOTTLE CAP AND CORK

Filed Sept. 19, 1927

Re. 18,669

INVENTOR.

James U. Duffy & J. Howard Richards

BY

Fay, Oberlin & Fay

ATTORNEYS.

Reissued Nov. 29, 1932

Re. 18,669

UNITED STATES PATENT OFFICE

JAMES U. DUFFY, OF CLEVELAND, AND JAMES HOWARD RICHARDS, OF CARROLTON, OHIO

BOTTLE CAP AND STOPPER

Original No. 1,747,760, dated February 18, 1930, Serial No. 220,394, filed September 19, 1927. Application for reissue filed August 1, 1931. Serial No. 554,559.

The present invention relates to a bottle cap and stopper for use on bottles designed for receiving the usual crimped cap, the present combined stopper and cap being used either as a replacement for a bottle when opened and partially used or for original use in sealing the bottle.

The present cap and stopper is so designed as to provide a stopper which will fit snugly and grip the interior neck surface of a bottle as well as to provide a cap portion adapted to engage over the usual flange or bottle mouth ring and thus combines the functions of an outside engaging cap with a stopper portion and the unit is so made as to furnish a tight seal for bottles having a charged content. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
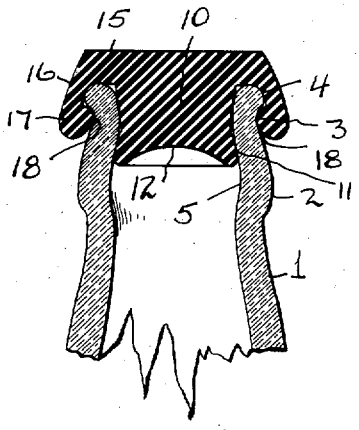
Figure 2:
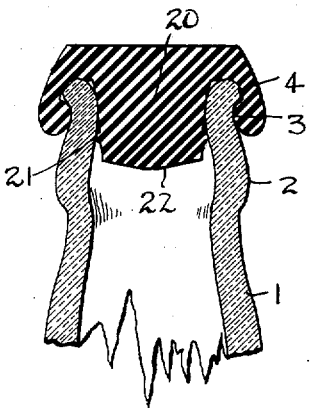
Figure 3:
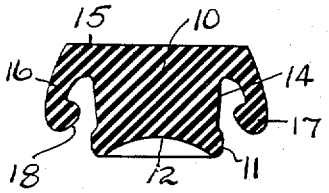
Figure 4:
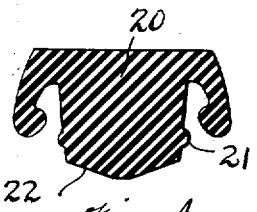
Figure 5:
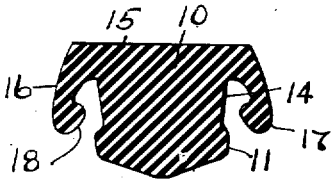
Figure 6:
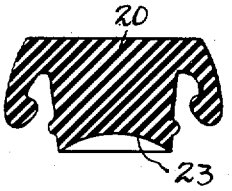

In said annexed drawing:

Fig. 1 is a vertical sectional view showing a combined cap and stopper in place in a bottle neck; Fig. 2 is a view similar to Fig. 1, but showing a slightly modified structure; Figs. 3 and 4 are sectional views of the caps and stoppers shown in the bottle necks in Figs. 1 and 2 respectively; Figs. 5 and 6 are sectional views of modified forms of the stoppers shown in Figs. 3 and 4 respectively.

In Figs. 1 and 2 the usual type of bottle neck is shown, this neck 1 having an outwardly bulging portion 2 with an outer portion 3 of reduced diameter and terminating at the top in a slightly overhanging flange or rim 4. The interior of the neck has an enlarged portion 5 corresponding with the bulge 2 on the outside.

The present combined cap and cork as shown in Figs. 1 and 3, provides a stopper portion 10 slightly tapered in general shape but having an enlarged ring or flange 11 adjacent the bottom, the length of the stopper portion being sufficient to allow the flange 11 to seat itself in the enlarged portion 5 of the bottle neck when the cork is forced into the bottle. In the form shown in Figs. 1 and 3 the bottom of the stopper is concaved as at 12 and thus when in place in the bottle, the internal gas pressure tends to expand the sides of the stopper including the ring 11 into the enlarged bottle neck 5, thus aiding the seal. In the form shown in Fig. 5, the end of the stopper is convex rather than concave. In both cases the ring portion 11 of the stopper tapers slightly as does the upper portion 14 as this aids in forcing the stopper into position.

The upper portion of the combined unit comprises a disc-shaped top 15 formed integrally with the stopper 10, and this disc portion has a downwardly extending outwardly flaring flange 16 which terminates in an inwardly extending ring portion 17 formed with an upwardly beveled lower edge 18. This flange 16 is sufficiently long to allow the ring 17 to engage under the upper bulge 2 of the bottle neck where it engages snugly much in the same manner as the usual crimped cap except that the present stopper is made of a resilient material such as rubber and is sprung or forced into engagement.

In the form shown in Figs. 2 and 4, the cap and stopper are similar to the first form in all respects save for the stopper portion 20 which in this form tapers from top to bottom and is provided at a point so as to engage in the enlarged portion 5 of the bottle neck, with an encircling bead or ring 21. The bottom 22 of the stopper may be either convex as shown in Figs. 2 and 4, or may be hollowed out as at 23, shown in Fig. 6.

The inwardly beveled edge 18 on the cap portion of the stopper allows the cap to cam itself into engaging position over the bottle neck and at the same time aids in easy removal as it forms a finger grip so that one side may be moved up and over the top bulge of the bottle when the further removal is easily accomplished.

It has been found that with the extra flange or ring on the stopper portion adapted to seat tightly in the interior enlargement of the bottle neck that the present combined cap and stopper will hold under relative high gas pressure in the bottle and will prevent any leakage. The unit must of course be made of resilient material, a good grade of vulcanized rubber producing the most satisfactory results. These units may be used repeatedly, and until their resiliency is lost, will effectively seal the usual type of bottle holding charged beverages such as ginger ale, near beer, and the like, without the loss of either liquid or gas.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. A combined rubber bottle cap and stopper consisting of a stopper portion in the form of an elongated slightly tapering plug, said plug having an enlarged ring adjacent the lower end, said plug having a concave bottom surface of a depth not exceeding that of said enlarged ring and an integrally formed cap member having an outwardly and downwardly depending flange terminating in an inwardly extending thickened ring portion, said flange and ring portion being adapted to be forced over and around the bottle neck to bring said ring portion into elastic engagement therewith below the upper head.

2. A combined rubber bottle cap and stopper consisting of a stopper portion in the form of an elongated slightly tapering plug, said plug having an enlarged ring adjacent the lower end, said ring being also slightly tapered and being so positioned as to normally engage in the enlarged portion of a bottle neck, said plug having a concave bottom surface of a depth not exceeding that of said enlarged ring, and an integrally formed cap member having an outwardly and downwardly depending flange terminating in an inwardly extending ring portion, said flange and ring portion being adapted to be forced over and around the bottle neck to bring said ring portion into elastic engagement therewith below the upper head.

3. A combined rubber bottle cap and stopper consisting of a stopper portion in the form of an elongated slightly tapering plug, said plug having an enlarged ring adjacent the lower end, said ring being also slightly tapered and being so positioned as to normally engage in the enlarged portion of a bottle neck, said plug having a concave bottom surface of a depth not exceeding that of said enlarged ring, and an integrally formed cap member having an outwardly and downwardly depending flange terminating in an inwardly extending ring portion, said flange and ring portion being adapted to be forced over and around the bottle neck to bring said ring portion into elastic engagement therewith below the upper head, the lower edge of said flange and ring portion being tapered upwardly and inwardly to facilitate both mounting and removal of said combined cap and stopper.

4. A closure means for bottles and the like comprising a cap portion and a stopper portion formed integrally therewith, said stopper portion being in the form of an elongated slightly tapering plug having a recess in its lower end, and said cap portion having an outwardly and downwardly depending flange terminating short of the lower end of said plug and adapted to be forced over and around the bottle neck to bring the lower end of said flange into elastic engagement therewith below the rim thereof.

5. A closure means for bottles and the like comprising a cap portion and a stopper portion formed integrally therewith, said stopper portion being in the form of an elongated slightly tapering plug having a recess in its lower end and an enlarged ring of substantially semi-circular cross section adjacent said end, and said cap portion having an outwardly and downwardly depending flange terminating short of the lower end of said plug and adapted to be forced over and around the bottle neck to bring the lower end of said flange into elastic engagement therewith below the rim thereof.

6. A closure means for bottles and the like comprising a cap portion and a stopper portion formed integrally therewith, said stopper portion being in the form of an elongated slightly tapering plug having a recess in its lower end, and said cap portion having an outwardly and downwardly depending flange terminating short of the lower end of said plug in an inwardly extending thickened ring portion, said flange and ring portion being adapted to be forced over and around the bottle neck to bring said ring portion into elastic engagement therewith below the rim.

7. A closure means for bottles and the like comprising a cap portion and a stopper portion formed integrally therewith, said stopper portion being in the form of an elongated, slightly tapering plug having a recess in its lower end and an enlarged ring of substantially semi-circular cross section adjacent said end, and said cap portion having an outwardly and downwardly depending flange terminating short of the lower end of said plug in an inwardly extending thickened ring portion, said flange and ring portion being adapted to be forced over and around the bottle neck to bring said ring portion into elastic engagement therewith below the rim thereof.

8. A closure means for bottles and the like comprising a cap portion and a stopper portion formed integrally therewith, said stopper portion being in the form of an elongated slightly tapered plug having a recess in its lower end and an enlarged ring of substantially semi-circular cross section adjacent said end, said ring being also slightly tapered and being so positioned as to normally engage in the enlarged portion of a bottle neck, and said cap portion having an outwardly and downwardly depending flange terminating short of the lower end of said plug in an inwardly extending thickened ring portion, said flange and ring portion being adapted to be forced over and around the bottle neck to bring said ring portion into elastic engagement therewith below the rim thereof.

9. A closure means for bottles and the like comprising a cap portion and a stopper portion formed integrally therewith, said stopper portion being in the form of an elongated slightly tapered plug having a recess in its lower end and an enlarged ring of substantially semi-circular cross section adjacent said end, said ring being so positioned as to normally engage in the enlarged portion of a bottle neck, and said cap portion having an outwardly and downwardly depending flange terminating short of the lower end of said plug in an inwardly extending thickened ring portion, said flange and ring portion being adapted to be forced over and around the bottle neck to bring said ring portion into elastic engagement therewith below the rim, the inner edge of said ring portion being tapered upwardly and inwardly to facilitate both attachment and removal of said closure.

Signed by us this 24 day of July, 1931.

JAMES U. DUFFY.
JAMES HOWARD RICHARDS.